(12) United States Patent
Heijman et al.

(10) Patent No.: US 9,113,643 B2
(45) Date of Patent: Aug. 25, 2015

(54) PROCESS FOR THE PRODUCTION OF A LIQUID COFFEE CONCENTRATE

(71) Applicant: Koninklijke Douwe Egberts B.V., Utrecht (NL)

(72) Inventors: Gertjan Heijman, Gouda (NL); Wilhelmus Johannes de Bruin, Almere (NL); Maarten Juriaan Verhoeven, Den Bosch (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 14/170,358

(22) Filed: Jan. 31, 2014

(65) Prior Publication Data

US 2014/0147562 A1 May 29, 2014

Related U.S. Application Data

(63) Continuation of application No. PCT/NL2012/050543, filed on Aug. 1, 2012.

(30) Foreign Application Priority Data

Aug. 1, 2011 (EP) .................................... 11176077

(51) Int. Cl.
| | | |
|---|---|---|
| *A23C 9/14* | (2006.01) | |
| *A23F 5/46* | (2006.01) | |
| *A23F 5/28* | (2006.01) | |
| *A23F 5/24* | (2006.01) | |
| *A23F 5/26* | (2006.01) | |
| *A23F 5/50* | (2006.01) | |

(52) U.S. Cl.
CPC ... *A23F 5/46* (2013.01); *A23F 5/24* (2013.01); *A23F 5/26* (2013.01); *A23F 5/28* (2013.01); *A23F 5/285* (2013.01); *A23F 5/50* (2013.01)

(58) Field of Classification Search
CPC ............. A23F 5/46; A23F 5/285; A23F 5/24; A23F 5/28; A23F 5/50; A23F 5/26
See application file for complete search history.

(56) References Cited

U.S. PATENT DOCUMENTS

| 6,139,537 | A | * | 10/2000 | Tapper .......................... 604/501 |
| 6,319,537 | B1 | | 11/2001 | Cheng et al. |
| 2010/0316784 | A1 | | 12/2010 | Tonyes et al. |

FOREIGN PATENT DOCUMENTS

| EP | 0352842 | 1/1993 |
| EP | 0861596 | 9/1998 |

(Continued)

OTHER PUBLICATIONS

Clarke, R.J. et al., Chapter Three, Chemistry III: Volatile Compounds; Coffee Recent Developments, 2001 (ISBN 0-632-05553-7), 24 pages.

International Search Report for Application No. PCT/NL2012/050543, mail date Oct. 10, 2012, 4 pages.

(Continued)

*Primary Examiner* — Patricia George
(74) *Attorney, Agent, or Firm* — Foley & Lardner LLP (57) ABSTRACT

The present disclosure relates to a process for the production of a liquid coffee concentrate that has an improved storage stability at ambient temperature. The process comprises separating coffee extract resulting in a high aromatic coffee extract and a low aromatic coffee extract and subjecting the low aromatic coffee extract to a heat treatment and, optionally, a pH rising step.

34 Claims, 6 Drawing Sheets

(56) References Cited

FOREIGN PATENT DOCUMENTS

| | | |
|---|---|---|
| EP | 1374690 | 1/2004 |
| JP | 7227211 | 8/1995 |
| JP | 8173043 | 7/1996 |
| WO | WO 2007/043873 | 4/2007 |

OTHER PUBLICATIONS

Tikunov et al., A Novel Approach for Nontargeted Data Analysis for Metabolomics. Large-Scale profiling of Tomato Fruit Volatiles., Plant Physiology, Nov. 2005, pp. 1125-1137, vol. 139, American Society of Plant Biologists. 13 pages.

* cited by examiner

Fig. 6 SCHEME 2

PROCESS FOR THE PRODUCTION OF A LIQUID COFFEE CONCENTRATE

CROSS-REFERENCE TO RELATED APPLICATIONS

This Application is a continuation of International Patent Application No. PCT/NL2012050543, filed on Aug. 1, 2012, which claims the benefit of priority to European Patent Application No. 11176077.3, filed on Aug. 1, 2011, both of which are hereby incorporated by reference in their entireties.

FIELD

The invention relates to a process for the production of a liquid coffee concentrate that has an improved storage stability at ambient temperature.

BACKGROUND

Liquid coffee, and liquid coffee concentrates, are increasingly in demand for commercial and/or industrial purposes. The production and sales of liquid coffee, e.g. liquid coffee concentrates for use in coffee dispensing machines, makes it desirable to provide liquid coffee that has a sufficient shelf-life. Up to now, such liquid coffee products are mostly available in a frozen form, and sometimes refrigerated. Non-refrigerated storage would decrease supply chain costs. However, any products sold for non-refrigerated storage still have an undesirably short shelf-life.

Generally speaking, a liquid coffee (such as a concentrate or an extract) is unstable over time and becomes increasingly acidic at room temperature. As is known by the skilled person, the pH drop might be due to microbial action and to chemical reaction, such as a slow hydrolysis reaction of some compounds such as esters and lactones, oxidation of carbonyl group containing compounds or even the Maillard reaction occurring among polysaccharides and proteins. A pH of 4.8 is commonly considered in literature as the lower limit for taste acceptability. Below that pH level the coffee extract becomes undrinkable.

To overcome microbial acidification the liquid coffee is often treated by UHT (Ultra High Temperature). Particularly suitable UHT treatment is at 120° C. for a couple of seconds.

A reference addressing the chemical acidification is US 2010/0316784. Therein a treatment is proposed comprising adding an edible alkali source to a liquid coffee concentrate. This serves to artificially increase pH. Before or after the addition of alkali, a heat treatment is conducted so as to artificially drive acid-generation reactions in the coffee concentrate to completion. More particularly, the heat treatment is conducted between 140 and 146° C. at a holding time of at most 3 minutes. This method fails, however, to produce products of sufficient shelf-life and quality.

Another drawback of the aforementioned process is the addition of alkali. In many jurisdictions, such an addition is considered undesired and/or the resulting product is no longer entitled to be called a "coffee," like under the EC food regulations. It would be desirable to develop a process for making liquid coffee whereby the addition of ingredients other than those obtained from a coffee extract itself is unnecessary, and yet provide a storage stable liquid coffee concentrate of good flavor qualities.

Another reference addressing the stabilization of liquid coffee by treatment with alkali is EP 861 596. Herein a coffee extract is treated with an alkali, which is present in an amount effective to convert acid precursors present in the coffee extract to their respective acid salts, and thereafter neutralizing the treated coffee extract with an acid, in an amount sufficient to neutralize any excess alkali from the first step. Apart from the aforementioned drawback of using alkali, this method also adds acid, which increases the amount of foreign components present in the liquid coffee. Moreover, the method is essentially based on introducing ionic substances (salts) which are prone to adversely affect taste.

Yet another reference addressing shelf life of liquid coffees is EP 1 374 690. Herein a coffee extract is subjected, essentially immediately after preparation, to correction of acidity by the addition of a base or an anion resin. The resulting extract is subjected to pasteurisation. The pasteurisation is discussed with reference to holding times and temperatures that do not affect the organoleptic properties of the coffee extract. A typical temperature range is 100° C.-140° C. at a holding time of at most 1 minute. This method fails also to produce products of sufficient shelf-life and quality.

The object of the present invention is to provide a process with which an improvement of the quality of the coffee concentrate is obtained in storage stability as well as in flavor.

SUMMARY

In order to better address one or more of the foregoing desires, the disclosure, in one aspect, presents a process for the production of a liquid coffee concentrate with a pH of 4.8 to 6 comprising the steps of:
  a) subjecting roasted, ground coffee to one or more extraction steps with water resulting in a coffee extract,
  b) separating the coffee extract, either by fractionation during the extraction step(s) in a) or by aroma recovery after step a) resulting in a high aromatic coffee extract and a low aromatic coffee extract,
  c) subjecting at least 50% of the low aromatic coffee extract to a heat treatment of at least 120° C. at a holding time for at most 30 minutes,
  d) concentrating at least the treated low aromatic coffee extract,
  e) combining at least the concentrated low aromatic coffee extract with the high aromatic coffee extract,
  thereby obtaining a liquid coffee concentrate.

In another aspect, the disclosure provides a liquid coffee concentrate with a pH of 4.8 to 6 obtainable by the above-mentioned process.

DETAILED DESCRIPTION

In a broad sense, the invention is based on the judicious insight to conduct a relatively strong heat treatment at a certain holding time on a coffee extract wherefrom aroma components have been recovered prior to concentration. Further, the invention provides, preferably, a judicious combination of such a heat treatment step and a pH-rising treatment. More preferably, the pH rising step does not involve the addition of alkali. Most preferably, the process results in a hydrolysation of at least 150 mmoles acid/kg dry matter solids content in the final product. This is the difference between the amount of mmoles/kg dry matter solids content in the low aromatic coffee extract to be treated before and after the heat treatment multiplied by the wt/wt ratio dry matter solids content of the low aromatic coffee extract in the final product.

The coffee chosen for the extraction in step a) can be any type of roasted coffee. The provision of roasted coffee is well-known to the skilled person. For example, the starting material can be a customary coffee bean raw material for industrial extraction processes, which coffee origins are roasted in the customary manner. As a rule, to that end, a mixture of different types of coffee origins is used. The roasted coffee beans are ground, while generally, for the degree of grinding a compromise is sought between obtaining the largest possible surface and obtaining a lowest possible pressure drop across the extraction cell. As a rule, the ground beans have an average size of 2.0 millimeters.

In order to better preserve coffee aromas, the process of the present invention is conducted on a low aromatic coffee extract. This is obtained by a) subjecting roasted, ground coffee to one or more extraction steps with water resulting in a coffee extract, and b) separating the coffee extract, either by fractionation during the extraction step(s) in a) or by aroma recovery after step a) resulting in a high aromatic coffee extract and a low aromatic coffee extract.

Examples of aroma recovery after step a) include steam stripping, supercritical $CO_2$ extraction, and pervaporation. In another embodiment, the coffee extract is fractionated during the extraction step a). The specific coffee aroma, present in the high aromatic coffee extract resulting therefrom, has a more natural coffee character compared to coffee aroma recovered by means of steam stripping from the complete extract after step a). A high aromatic coffee extract and a low aromatic coffee extract are obtained. As known to a skilled man, a high aromatic coffee extract distinguishes itself from a low aromatic coffee extract by having a comparably high amount of volatile flavor compounds compared to semi volatile flavor compounds. Such compounds are known for example from Clarke R. J. and Vitzthum O. G., Coffee Recent Developments, 2001 (ISBN 0-632-05553-7), p. 71, table 3.3. From this table it is clear that on the one hand propanal, methyl propanal, and 2,3 butanedione are measurable volatile flavor compounds. Pyrazine compounds and guaiacol compounds on the other hand are semi volatile flavor compounds. Taking e.g. 2,3-butanedione as an example of a volatile coffee flavor compound and ethyl guaiacol (4-ethyl 2-methoxyphenol) as an example of a semi volatile coffee flavor compound, when these compounds are in a wt/wt ratio of 2,3-butanedione/ethyl guaiacol>30 in a particular coffee extract, that extract can be described as a high aromatic coffee extract. Consequently, a low aromatic coffee extract has a wt/wt ratio of 2,3-butanedione/ethyl guaiacol<30.

The high aromatic coffee extract is stored.

The low aromatic coffee extract is an undiluted or unconcentrated extract. Whilst, preferably, the treatment is conducted on an extract as is, it will be understood that a small change of the extract, by insubstantial dilution or insubstantial concentration, will not deviate from the gist of the invention. This is markedly different from the method disclosed in US 2010/0316784, where it is expressly required that the extract is concentrated prior to the heat treatment. An extract will generally have a dry matter solids content of 15% by weight or less, preferably of from 2 to 10% by weight. A concentrate is distinguished from an extract by having undergone a substantial water removing step such as water evaporation. Whilst a concentrate will generally have a dry matter solids content of 6 wt. % to 80 wt. %, it will usually be at least 10 wt. % higher in dry matter solids than the preceding extract, and regularly has a dry matter solids content of above 10 wt. %, particularly above 15 wt. %.

At least 50 v/v %, more preferably 75 v/v %, most preferably all (100%) of the low aromatic coffee extract is subjected to a heat treatment of at least 120° C. at a holding time for at most 30 minutes, preferably at a temperature of at least 135° C. at a holding time of at most 15 minutes, more preferably at least 150° C. at a holding time of at most 10 minutes. In general, the higher the temperature the shorter the holding time. In particular, below 150° C. the holding time has to be at least 10 minutes. In this respect, the above-mentioned publications teach away from the present invention as the temperatures and holding times disclosed are below 150° C. and shorter than 3 minutes. Preferably, the heat treatment is conducted from 120° C. to 200° C. at a holding time of 30 minutes to 10 seconds. More preferably, the heat treatment is conducted from 135° C. to 180° C. at a holding time of 15 minutes to 1 minute. Most preferably, the heat treatment is conducted from 150° C. to 180° C. at a holding time of 10 minutes to 1 minute. As a particular example the heat treatment can be conducted at about 150° C. with a holding time of about 5 minutes.

Heating times may include heating from ambient temperature to the holding temperature during 1-8 minutes, preferably 3-5 minutes.

Cooling times may include cooling to ambient temperature during 1-8 minutes, preferably 3-5 minutes.

In a preferred embodiment, the process comprises a pH rising step (de-acidification or pH adjustment step) after step b). This pH rising step may be conducted before or after the concentration step d). Preferably, the pH rising step is conducted before the concentration step whereby the low aromatic extract is subjected to a pH rising step, i.e. the low aromatic extract is subjected to the pH rising step before or after the heat treatment step c).

With the pH-rising step the pH is raised to a less acidic (more alkaline) pH, preferably having a value of from 5-10. This raise is relative to the starting pH. In other words, if the starting pH is 4, the pH rise could be to a value that is still acidic, e.g. 5. However, preferably the starting pH of the coffee stream is 4.5 to 6.5, more preferably of from 4.9 to 5.7. After the treatment steps the pH will again be at normal level such as between 4.8 and 6.

In a preferred embodiment of the process of the invention, the pH rise of the low aromatic extract is conducted prior to the heat treatment. In this embodiment it is further preferred that the pH is raised to a value of 6 to 8. In another preferred embodiment, the pH rise is conducted after the heat treatment. In this embodiment it is further preferred that the pH is raised to a value of 5 to 7.

The pH-rising step can be conducted by adding edible alkali. Sources of edible alkali are known, and have also been described in the aforementioned US 2010/0316784.

More preferably, however, the pH-rising step is conducted without adding alkali. By avoiding the addition of foreign substances, it is secured that the product after treatment remains considered to be "coffee" in accordance with the applicable food legislation in many jurisdictions. For, in such jurisdictions the addition of substances other than those obtained from the extraction will result in a product that is not allowed to be indicated as a coffee. It will be understood that such a product may receive a different perception by consumers. An underlying technical problem thus is the provision of a process that sufficiently treats the coffee so as to result in a product of sufficient storage stability and aroma quality, yet without the addition of foreign substances such as edible alkali.

This is secured in a preferred embodiment of the invention, wherein in the pH rising step use is made of an ion exchange resin and/or an adsorber. The adsorber may be carbon based, polyacrylate based or polystyrene based. Examples of commercial adsorbers include Purolite® MN 200, Purolite® MN 202, and Lewatit® AF5. Examples of the ion exchange resins include strong or weak basic anion exchange resins. Preferably, the ion exchange resin is a weak basic anion exchange resin. The resin is based on polyacrylate or polystyrene, preferably polyacrylate. The functional groups are e.g. amine functional groups, such as primary, tertiary, and quaternary amine groups as well as polyamine groups, preferably tertiary amine groups. In the following table examples of commercial ion exchange resins are listed.

| Name | Matrix | gel/macro-porous | functional group | % of quaternary amines (SBA) | total capacity (eq/L) |
|---|---|---|---|---|---|
| Rohm & Haas IRA 67 | polyacrylic | gel | tertiary amine | 24% | 1.6 |
| Lewatit ® XA 945 | | | | | |
| Lewatit ® MP 62 | polystyrene | macroporous | tertiary amine | 3% | 1.7 |
| Purolite ® A 172 | polystyrene | gel | tertiary amine | 2% | 1.2 |
| Lewatit ® A 365 | polyacrylic | gel | poly amine | | |
| Lewatit ® VP OC 1075 | polyacrylic | gel | poly amine | 14% | 2.9 (3.4) |
| Lewatit ® VP OC 1065 | polystyrene | macroporous | primary amine | | 2.2 |
| Lewatit ® MonoPlus M 500 | polystyrene | gel | quaternary amine, Type I | 100% | 1.2 |
| Lewatit ® M 600 | polystyrene | gel | quaternary amine, Type II | 100% | 1.1 |

In the lower temperature ranges, viz. from 120° C. to below 150° C., the pH-rise is preferably effected prior to the heat treatment. Without wishing to be bound by theory, the present inventors believe that the pH-rise is capable of catalyzing acid-releasing reactions. The effect thereof is more pronounced in the lower regions of the heat treatment conditions.

Preferably, the heat treatment is an extreme heat treatment in the sense that it is conducted in the higher temperature ranges of 150° C. or above. Here the process is more robust in the sense that the order as well as the strength of the pH rising step is less critical. This has significant advantages not only creating a greater freedom of processing (viz. the order of the treatment steps), but also requiring a lesser degree of de-acidification.

In connection with the addition of foreign substances such as edible alkali, it is particularly preferred in this embodiment to choose the aforementioned conditions of extreme heat treatment. Thus, the addition of alkali can be minimized.

In the last steps the low aromatic coffee extract is concentrated. Preferred concentrates comprise 6 wt. % to 80 wt. % coffee solids, preferably 10 wt. % to 65 wt. %, more preferably 15 wt. % to 50 wt. %. Methods of concentration such as evaporating water are well-known to the skilled person.

In the event that part (i.e. at least 50%) of the low aromatic coffee extract has been treated, the untreated low aromatic coffee extract may be combined with the treated low aromatic coffee extract, i.e. before concentration, or with the treated concentrated low aromatic coffee extract, i.e. after concentration.

Generally, after concentration the concentrated treated low aromatic extract is mixed with the high aromatic extract. This can be done in the factory before optionally further treatment steps and packaging or just before dosing by the consumer. In the latter case, two separate packages are provided to the consumer to be introduced in the coffee preparing machine.

In the factory, after temporary, preferably cooled, storage, preferably at a temperature below 25° C., more preferably below 10° C., most preferably below 0° C., the high aromatic coffee extract may directly, without further processing, be added to the concentrated low aromatic coffee extract. It is preferred that the high aromatic coffee extract is stored as briefly as possible and cooled, preferably at an atmosphere of an inert gas such as nitrogen for adding to the concentrated low aromatic coffee extract; owing to these steps loss of aroma and aroma degradation reactions are limited as much as possible.

Accordingly, the present process provides for a liquid coffee concentrate with a pH of 4.8 to 6 that can be stored at ambient temperature (generally indicating a temperature of 5° C. to 25° C., and preferably without the need for refrigerating equipment) at an acceptable shelf-life without acidification to occur, and capable of being kept without substantial off-flavors to arise.

In a preferred embodiment, the extraction in step a) is preferably done as a split extraction. Processes of split extraction are known. A reference in this respect is WO 2007/043873. More particularly, the process involves primary and secondary extraction.

In a preferred embodiment of split extraction, the invention is put to use in the following method for preparing a coffee concentrate. In the method, roasted, ground coffee is subjected to a primary extraction with water, whereby a first primary extract (i.e. the high aromatic coffee extract) is obtained with a draw-off factor of at most 2.5, preferably at most 2.0, more preferably at most 1.5 and most preferably at most 1.0. Thereafter, optionally, a second primary extract is obtained.

The primarily extracted, roasted, ground coffee is then fed to a secondary extraction section in which, with water having a feed temperature between 120 and 210° C., a secondary extract is obtained (the low aromatic coffee extract). At least 50 v/v %, more preferably 75 v/v %, most preferably all (100%) of the secondary extract is then subjected to the process steps of the present invention. Optionally, the second primary extract may be added to the secondary extract (the low aromatic coffee extract) before or after the treatment step(s) of the present invention, preferably the second primary extract is added before the treatment to the secondary extract.

The term "draw-off factor" is understood to mean the ratio of the mass of the extract and the mass of the dry roasted and ground coffee in the primary extraction cell. In practice, this draw-off factor is determined by a compromise between, on the one side, a sufficient degree of coffee aroma recovery in the first primary extract, and, on the other side, a lowest possible volume of the first primary extract. The draw-off factor for that matter depends on the used coarseness or degree of grinding of the roasted coffee, the extraction cell and, in particular, the number of percolators placed in series, the used water-coffee ratio, the cycle time, the feed water temperature and the desired concentration of the end product and the like.

In a further preferred embodiment of split extraction, also a second primary extract is recovered from the primary extraction cell. To that end, after draw-off and storage of the first primary extract, further extraction takes place in the primary extraction cell.

The recovery of both a first and second primary extract is particularly attractive when a high water-coffee ratio is applied. Preferably, the water-coffee ratio is between 5.0 and 15. More preferably, the water-coffee ratio is lower than 10, and most preferably, the water-coffee ratio is between 6.5 and 8.5.

When a second primary extract is recovered, preferably, the first fraction of the secondary extract is indeed used as primary feed water in the first extraction cell. For this embodiment, the teachings of EP-A-0 352 842 are included herein by reference.

The second primary extract can be subjected to aroma recovery. The recovered aromas are added to the high aromatic extract. The second primary extract after the aroma recovery may be added to the secondary extract (the low aromatic coffee extract) before or after the treatment step(s) of the present invention, preferably the second primary extract is added before the treatment to the secondary extract. After concentration the concentrated low aromatic coffee extract and the high aromatic coffee extract (comprising the recovered aromas) are combined.

In this embodiment of the invention, the primary extraction is carried out with water at a feed water temperature which is lower than that which is used in the secondary extraction. Preferably, the temperature at which the primary extraction is carried out is between 70 and 120° C.

The primary extraction can be carried out as an exhaustive extraction. "Exhaustive extraction" is understood to mean that extraction takes place until the extract hardly, if at all, differs from the water introduced into the extraction cell. In practice however, it will be beneficial to the efficiency of the entire process, in particular because of the subsequent concentration steps, when extraction is not exhaustive.

"Water" for that matter is understood to include customary aqueous solutions that can also be used in the known industrial extraction processes.

The primary and secondary extractions can be carried out in customary extraction cells. In a preferred embodiment, both the primary and the secondary extraction are carried out in a percolator or in percolators placed in series. In particular, the secondary extraction is advantageously carried out in at least 2, and preferably at least 4 series-connected percolators. As a rule, the number of percolators used in the primary extraction section is at least 0.5 which means that during 50% of the cycle time a percolator is connected in the primary extraction section. Preferably, at least 1 or 2 percolators are connected in the primary extraction section.

In a preferred embodiment of the process according to the invention, the low aromatic coffee extract is at least part but preferably the total of a secondary extract. In one further preferred embodiment hereof, the treated low aromatic coffee extract is combined with a second primary extract prior to the concentration step. In another preferred embodiment hereof, the low aromatic coffee extract is a mixture of at least part but preferably the total secondary extract and the second primary extract.

It has also been found that the second primary extract can be subjected to the treatment of the present invention. In that respect, both the second primary extract and the secondary extract are considered the low aromatic coffee extract of which at least part of the second primary extract is treated which part to be treated comprises at least 25 v/v %, more preferably at least 35 v/v %, most preferably at least 50 v/v % of the low aromatic coffee extract. After the treatment, the treated part of the second primary extract is added to the non-treated part of the second primary extract and the secondary extract and concentrated. Preferably, all of the second primary extract is treated.

Preferred is also the use of customary liquid or dried filler components. A filler component is sometimes used to neutralize the marked flavour character of the first primary extract to some extent. The filler is preferably a high yield coffee product. It may be added to the low aromatic coffee extract before concentration, more preferably before the temperature treatment.

The invention also pertains to a liquid coffee concentrate with a pH of 4.8 to 6 obtainable by the process of the invention. The liquid coffee concentrate comprises 6 wt. % to 80 wt. % coffee solids, preferably 10 wt. % to 65 wt. %, more preferably 15 wt. % to 50 wt. %. This coffee concentrate is distinguished from coffee concentrates not according to the invention, on account of its better storage stability at ambient temperature, as can be identified with reference to the reduced, or preferably absent, pH lowering, and to reduced, and preferably absent occurrence of off-flavors. Preferably, the liquid coffee concentrate has a storage stability of more than 6 months, more preferably more than 12 months, most preferably more than 18 months.

A product treated by the process according to the present invention distinguishes itself by comprising at least 2 mg/kg dry matter of 2-phenyl-3-(2-furyl)-2-propenal.

Accordingly, the present invention also relates to a liquid coffee concentrate with a pH of 4.8 to 6 comprising at least 2 mg/kg dry matter solids of 2-phenyl-3-(2-furyl)-2-propenal, preferably between 4 mg/kg dry matter solids and 80 mg/kg dry matter solids, more preferably between 4 mg/kg dry matter solids and 40 mg/kg dry matter solids.

Alternatively, a product treated by the process according to the present invention distinguishes itself by having a QA/QaL mol/mol ratio between 10 and 100 at a pH between 5 and 5.2. More particularly, during the shelf life the liquid coffee concentrate will enter a pH window between 5 and 5.2. In that pH window it should have a QA/QaL mol/mol ratio between 10 and 100.

Accordingly, the present invention also relates to a liquid coffee concentrate with a pH between 5 and 5.2 and a QA/QaL mol/mol ratio between 10 and 100, preferably between 30 and 100, most preferably 60 to 100. In a preferred embodiment, this liquid coffee concentrate will have a potassium content of 55 g or less per kg dry matter, preferably 20-55 g/kg and/or a sodium content of 4 g or less per kg dry matter, preferably 0.1-4 g/kg.

The abbreviation QA stands for Quinic acid, i.e. 1,3,4,5-tetrahydroxycyclohexanecarboxylic acid. The abbreviation QaL stands for Quinic acid lactone, i.e. 1,3,4-trihydroxy-6-oxabicyclo[3.2.1]octan-7-one.

Figure 5:
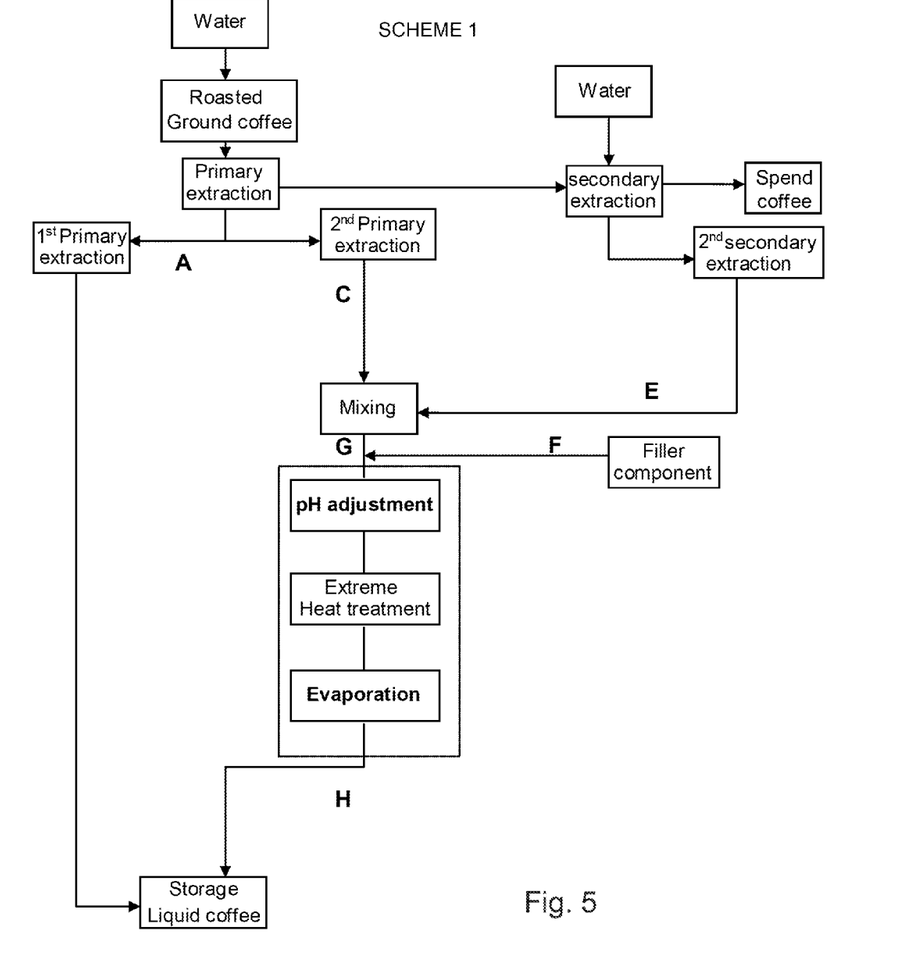
FIG. 5 is a flow chart of a process of making a coffee concentrate, according to one embodiment.
Figure 6:
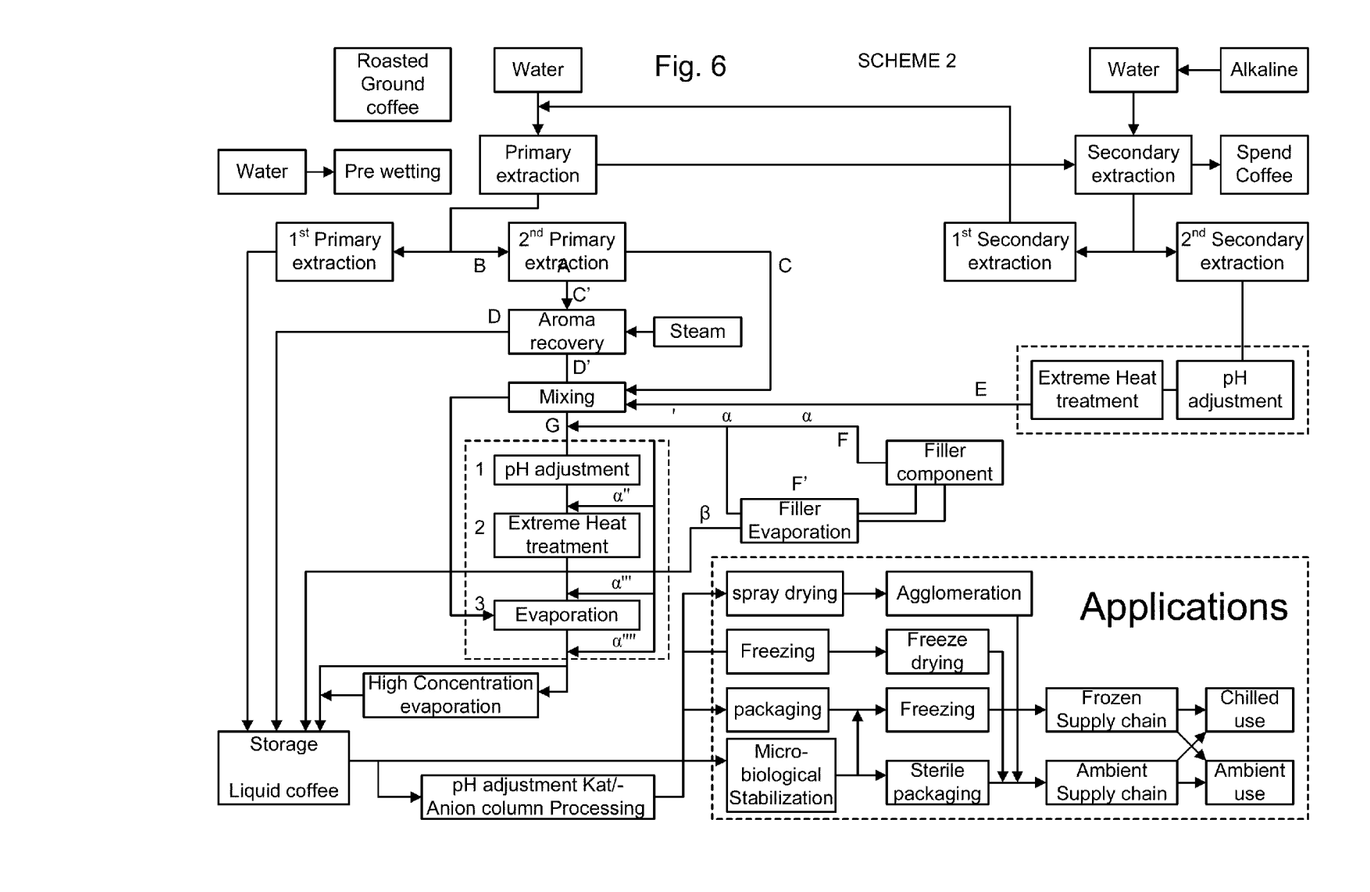
FIG. 6 is a flow chart of a process of making a coffee concentrate, according to another embodiment.

Various embodiments of the invention are further explained with reference to the Examples and Schemes 1 and 2, shown in FIGS. 5 and 6, which provide process schemes for implementing the treatment steps of the disclosure in processes for making coffee concentrates. These schemes serve illustrative purposes, and do not limit the invention.

In Scheme 1 (FIG. 5), a preferred embodiment of the invention is illustrated. Roasted coffee is subjected to split extraction, with split tapping (rendering first and second primary and secondary extractions). The second primary extract is combined with the second secondary extract, and this stream is subjected, before concentration, to pH adjustment (by anion exchange), and extreme heat treatment (at the above-identified temperatures). The concentrated extract is combined with the first primary extract resulting in a liquid coffee concentrate of the present invention.

Scheme 2 (FIG. 6) illustrates a further preferred embodiment. Therein, either the second secondary extract or the $2^{nd}$ primary extract or both and mixtures thereof are subjected to the pH adjustment by anion exchange and heat treatment, before being combined with the first primary extract. The $2^{nd}$ primary extract may be subjected to aroma recovery, so that after concentration the concentrated coffee extract is mixed with $1^{st}$ primary extract as well as the aroma recovery product. Optionally, a filler component can be added either before or after concentration.

Analytical Method for QA and QaL

Quinic acid lactone (QaL), was obtained from Syncom, Groningen, the Netherlands. A working solution of approximately 0.5 mg per ml was obtained by diluting QaL in acetonitrile. This working solution was further diluted in 0.1% acetic acid in acetonitrile to obtain calibration solutions of 15 ng/ml up to 15000 ng/ml.

Concentrated coffee products were diluted with water to 0.28% dry matter.

50 µl of the diluted coffee product is further diluted with 950 µl 0.1% acetic acid in acetonitrile.

Quantification was performed with a Triple Quad MS, TSQ Quantum Ultra; Thermo Scientific Mass spectrometer coupled to a Accela UPLC from Thermo Scientific.

Concentrations were calculated from the calibration curve.

Quinic acid (QA), was obtained from Aldrich. A working solution of approximately 1 mg per ml was obtained by dissolving the compound in water. This working solution was further diluted in 0.4 mM heptafluorobutyric acid to obtain calibration solutions of 10 µg/ml up to 40 µg/ml.

Concentrated coffee products were diluted with 0.4 mM heptafluorobutyric acid to 0.1% dry matter (w/w) dry coffee solids.

Quantification was performed with a Dionex ICS 5000 DC suppressed conductivity chromatograph.

Concentrations were calculated from the calibration curve.

Analytic method for 2-phenyl-3-(2-furyl)-2-propenal 2-phenyl-3-(2-furyl)-2-propenal, was obtained from Chemos GmbH, Werner-von-Siemens-Straβe, D-93128 Regenstauf, Germany (purity 97%). A working solution of 1 mg per ml was obtained by diluting the compound in hexane. This working solution was further diluted to obtain calibration solutions of 0, 0.6, 1, 3, 6, 10 and 50 µg 2-phenyl-3-(2-furyl)-2-propenal per ml hexane.

Liquid coffee concentrates were diluted with water to 2.5% dry matter.

Volatiles in the coffee headspace were analysed by solid phase micro-extraction (SPME) coupled to gas chromatography/mass spectrometry (GC/MS), essentially as described in Tikunov et al., 2005, Plant Physiology 139, 1125-1137, was calculated from the linear calibration curve of the authentic standard in the coffee matrix.

Example 1

Extraction

Split Stream

From a single batch of ground coffee, a coffee extract is obtained by split stream extraction as described in WO 2007/043873.

A $1^{st}$ primary extract (stream A in FIG. 5), which is high in flavor, the high aromatic coffee extract, is left untreated or concentrated and will be added to the concentrated low aromatic coffee extract (stream H) prior to UHT treatment and packaging. All of the secondary extract is mixed with $2^{nd}$ primary extract (stream C). The resulting mixture (Stream G) is composed of 72.7% w/w secondary extract (stream E) and 27.3% w/w $2^{nd}$ primary extract (stream C).

Adding Filler

An unconcentrated high yield extract (stream F) is made from a second batch of coffee. This high yield extract is directly added to the low aromatic coffee extract. This results in a mixture of dry matter solids content of approximately 6%.

Processing

The pH of the low aromatic coffee extract is adjusted by passing the extract over an anion column (Lewatit® XA 945) to pH 8.

The low aromatic coffee extract is heated from ambient conditions to 150° C. in 5 minutes, and kept at that temperature for 5 consecutive minutes, followed by a cooling step of 3 minutes.

The heat treated low aromatic coffee extract is concentrated to a dry matter solids content of 28% by evaporation.

During these process steps>150 mMoles acid/kg dry matter solids content is released by hydrolysis The concentrated low aromatic coffee extract is mixed with the high aromatic coffee extract ($1^{st}$ primary extract) (stream A).

Final Product

The resulting pH of the liquid coffee concentrate is 6.2

No detectable off flavor is detected in the liquid coffee concentrate.

During a shelf life of 8 weeks the liquid coffee concentrate is not perceived as acidified by a team of sensory experts.

By comparison, products manufactured according to the process described in US 2010/0316784 do show acidification during this shelf life period.

Example 2

A single batch of Arabica coffee is subjected to the extraction as described in Example 1. The primary extract, i.e. the high aromatic coffee extract, comprises 16 wt. % of the total coffee dry matter and has a BD/EG wt/wt ratio of 100. The low aromatic coffee extract comprises 84 wt. % of the total coffee dry matter. The pH of the low aromatic coffee extract obtained therefrom with a dry matter solids content of approximately 6% is adjusted by passing the extract over an anion column (Lewatit® XA 945) to pH 6. The amount of acids was assessed by titration up to pH 8. The low aromatic coffee extract having 287 mmoles acid/kg dry matter is heated from ambient conditions to 160° C. in approximately 3.5 minutes, and kept at that temperature for 10 consecutive minutes, followed by a cooling step of approximately 2 minutes. The treated low aromatic coffee extract has 818 mmoles acid/kg dry matter. The heat treated low aromatic coffee extract is concentrated. This process results in a hydrolysation of at least 446 mmol acid/kg dry matter solids content in the final product ((818−287)*0.84).

The concentrated low aromatic coffee extract is mixed with the high aromatic coffee extract ($1^{st}$ primary extract) (stream A). The resulting pH of the liquid coffee concentrate is 5.34. The liquid concentrate has a dry matter solids content of 28%.

No detectable off flavor is detected in the liquid coffee concentrate.

Figure 1:
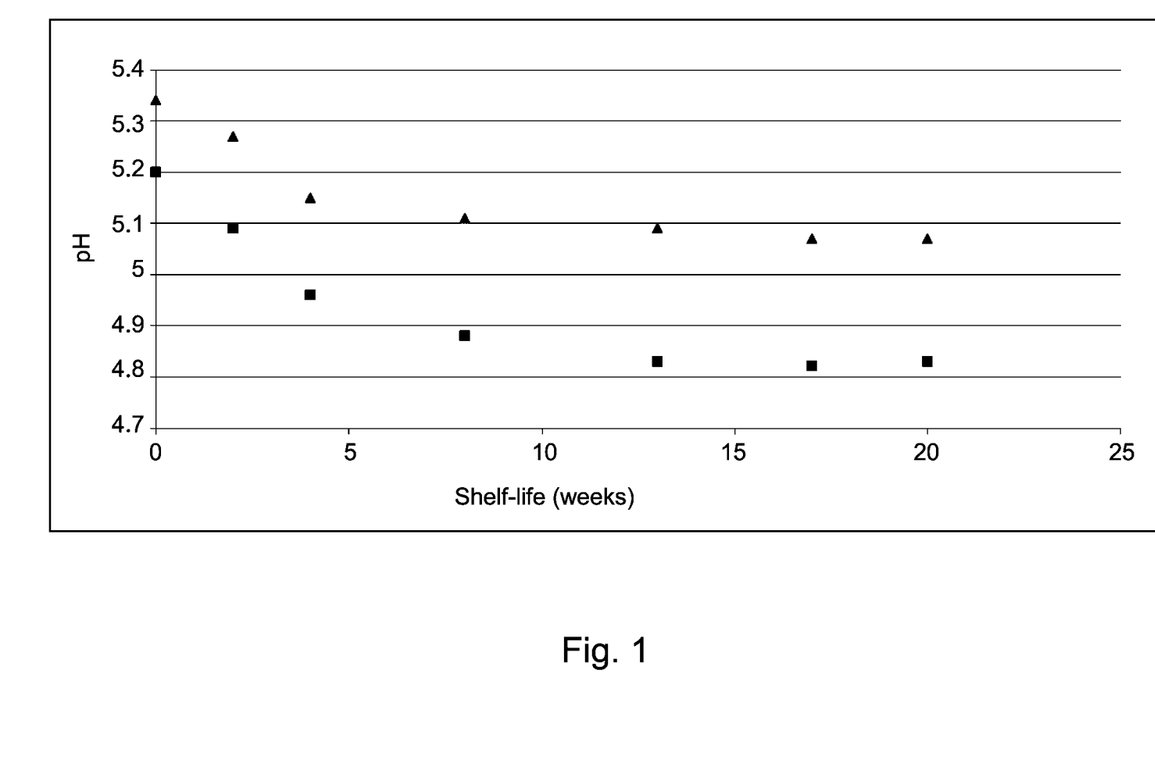
FIG. 1 is a chart depicting the pH level versus time for a liquid coffee concentrate prepared in accordance with Example 2 herein, according to one embodiment.

The pH was followed in time as shown in FIG. 1 (▲). During 28 weeks shelf life the product does not drop in pH below 5. When assessed by expert tasters, no unpleasant acidity can be detected in the product.

The liquid coffee concentrate comprises an amount of 7.5 mg/kg dry matter solids 2-phenyl-3-(2-furyl)-2-propenal.

The amount of potassium is 53 g/kg dry matter and the amount of sodium is 2 g/kg dry matter. After 8 weeks storage the pH of the concentrate is 5.1 and the QA/QaL mol/mol ratio is 90.

For comparison, a liquid coffee concentrate is prepared in the same manner as described above except that the heat treatment is omitted. The resulting liquid coffee concentrate has a pH of 5.2. Within 4 weeks, this product drops below pH 5 (see FIG. 1 (■)). When assessed by expert tasters the product is unpleasantly sour.

Example 3

Example 2 was repeated whereby the low aromatic coffee extract was subjected to various temperature and time treatments. The experiments are provided in FIG. 2. On the y axis is given the temperature in degrees Celsius at which coffee extracts were treated, the x axis gives the duration of the heat-treatment in minutes. The numbers in FIG. 2 indicate the amount of mMoles acid/kg dry matter solids content in the final product which is released by hydrolysis.

Figure 2:
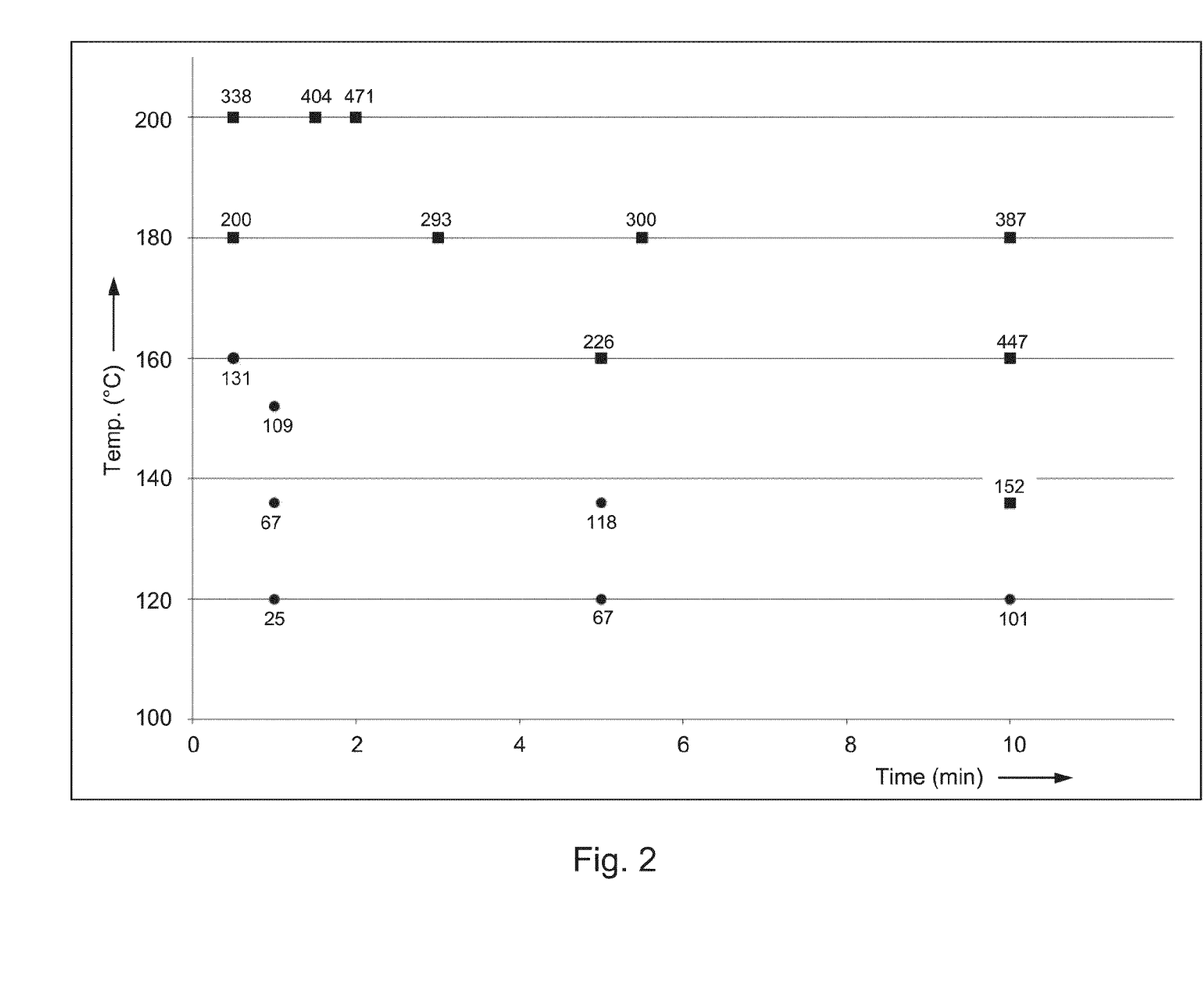
FIG. 2 is a chart depicting characteristics of the liquid coffee concentrate of Example 2 in response to various temperature and time treatments, according to one embodiment.

The "■" marker of FIG. 2 indicates a coffee extract which yielded more than 150 mMoles acid/kg dry matter solids content in the final product released by hydrolysis and thus are obtained with the process of the invention The "●" marker of FIG. 2 indicates a coffee extract which yielded less than 150 mMole acid/kg dry matter solids content in the final product released by hydrolysis. Accordingly, these are comparative examples.

Example 4

A single batch of Arabica coffee is subjected to extraction whereby aromas were fractionated from a highly aromatic coffee by means of steam distillation as described in EP-A-0 352 842. This results in a steam distillate, i.e. the high aromatic coffee extract (stream D) and a low aromatic coffee extract comprising stream D' and stream E in FIG. 6.

The pH of the low aromatic coffee extract with a dry matter solids content of approximately 5% is adjusted by passing the extract over an anion column (Lewatit® XA 945) to pH 6. The low aromatic coffee extract is heated from ambient conditions to 180° C. in 6 minutes, and kept at that temperature for 1.5 consecutive minutes, followed by a cooling step of 3 minutes.

The heat treated low aromatic coffee extract is concentrated. This process results in a hydrolysation of 395 mMoles acid/kg dry matter solids content in the final product.

The concentrated low aromatic coffee extract is mixed with the high aromatic coffee extract (stream D).

The resulting pH of the liquid coffee concentrate is 5.35. The liquid concentrate has a dry matter solids content of 28%.

No detectable off flavor is detected in the liquid coffee concentrate.

Figure 3:
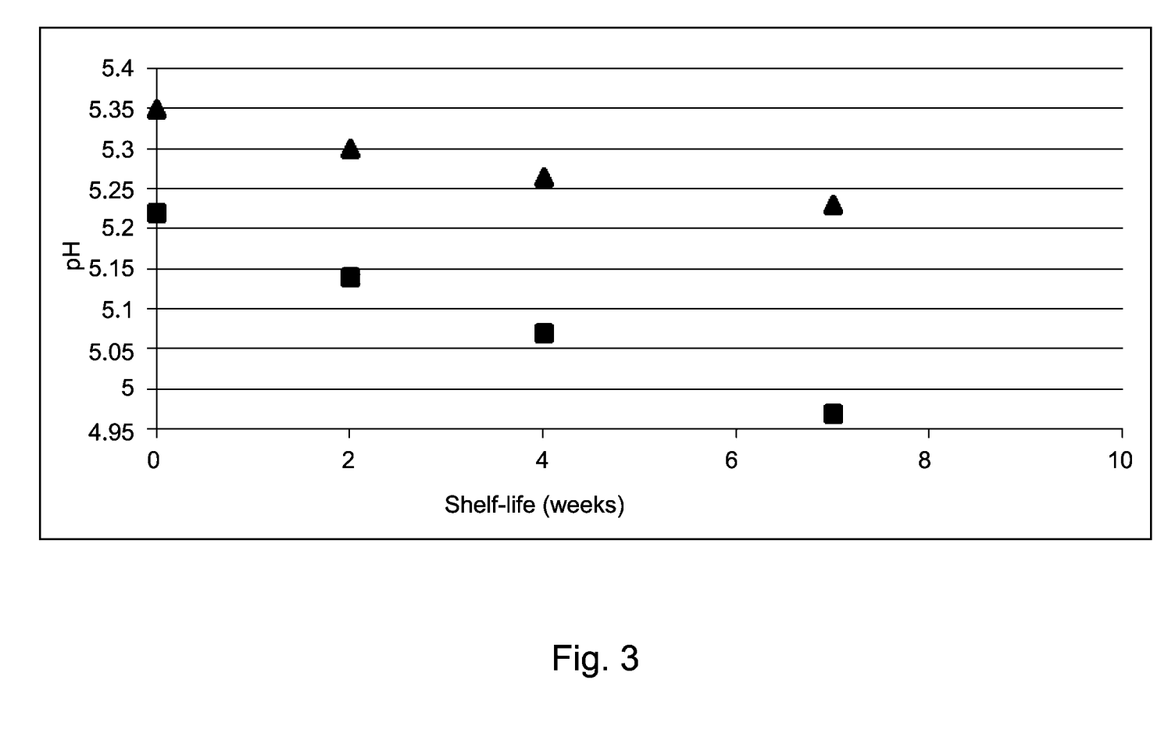
FIG. 3 is a chart depicting the pH level versus time for a liquid coffee concentrate prepared in accordance with Example 4 herein, according to one embodiment.

The pH was followed in time as shown in FIG. 3 (▲). During 7 weeks shelf life the product does not drop in pH below 5. When assessed by expert tasters, no unpleasant acidity can be detected in the product.

The liquid coffee concentrate comprises an amount of 6 mg/kg dry matter coffee solids 2-phenyl-3-(2-furyl)-2-propenal. The amount of potassium is 50 g/kg dry matter and the amount of sodium is 3 g/kg dry matter.

For comparison, a liquid coffee concentrate is prepared in the same manner as described above except that the heat treatment is omitted. The resulting liquid coffee concentrate has a pH of 5.2. Within 6 weeks, this product drops below pH 5 (see FIG. 3 (■)) When assessed by expert tasters the product is unpleasantly sour.

Example 5

Extraction

Split Stream

From a single batch of ground coffee, a coffee extract is obtained by split stream extraction as described in WO 2007/043873.

A $1^{st}$ primary extract (stream A in FIG. 6), the high aromatic coffee extract, is left untreated. All of secondary extract (stream E) (about 55 v/v %) is left untreated as well.

Processing

All of the $2^{nd}$ primary extract (stream C) (about 45/v %) is treated by adjusting the pH to 6 by passing the extract over an anion column (Lewatit® XA 945).

The $2^{nd}$ primary extract is heated from ambient conditions to 180° C. in 6 minutes, and kept at that temperature for 2.5 consecutive minutes, followed by a cooling step of 2.5 minutes.

This process results in a hydrolysation of at least 176 mMoles acid/kg dry matter solids content in the final product The heat treated $2^{nd}$ primary extract is mixed with the untreated secondary extract and concentrated.

The concentrated low aromatic coffee extract is mixed with the high aromatic coffee extract ($1^{st}$ primary extract) (stream A).

The resulting pH of the liquid coffee concentrate is 5.27 and has a dry matter solids content of 28%.

No detectable off flavor is detected in the liquid coffee concentrate during storage.

Example 6

A single batch of Arabic coffee is subjected to the extraction as described in Example 2. The pH of the low aromatic coffee extract obtained therefrom with a dry matter solids content of approximately 6% is adjusted by addition of KOH to pH 6. The low aromatic coffee extract is heated from ambient conditions to 150° C. in approximately 3.5 minutes and kept at that temperature for 10 consecutive minutes, followed by a cooling step of approximately 2.5 minutes. The heat treated low aromatic coffee extract is concentrated. The concentrated low aromatic coffee extract is mixed with the high aromatic coffee extract (1$^{st}$ primary extract) (stream A).

The resulting pH of the liquid coffee concentrate is 5.4 and a dry matter solids content of 28%. This process results in a hydrolysation of at least 220 mMoles acid/kg dry matter solids content in the final product. No detectable off smell is detected in the liquid coffee concentrate but a metallic off taste was present due to the presence of KOH.

Figure 4:
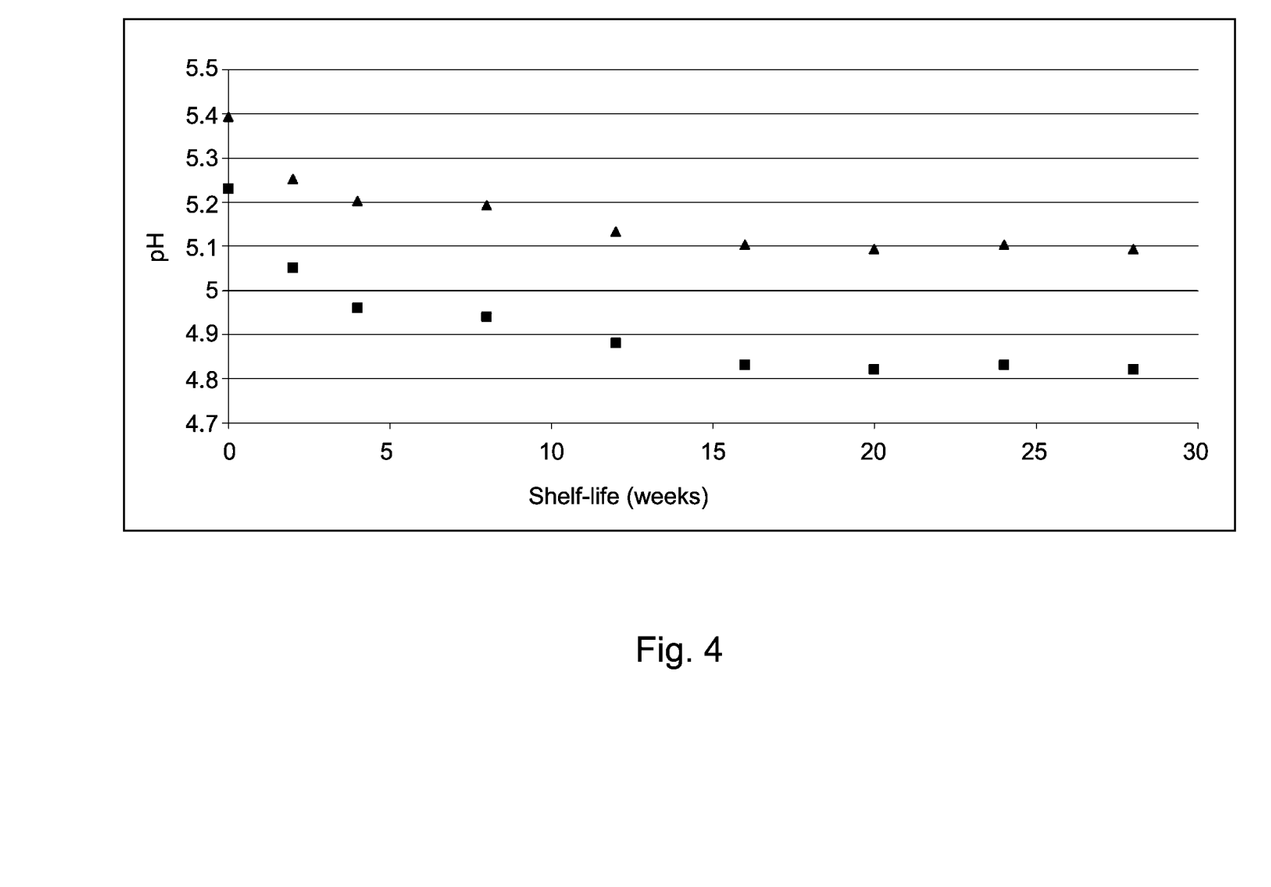
FIG. 4 is a chart depicting the pH level versus time for a liquid coffee concentrate prepared in accordance with Example 6 herein, according to one embodiment.

The pH was followed in time as shown in FIG. 4 (▲). During 28 weeks shelf life the product does not drop in pH below 5. When assessed by expert tasters, no unpleasant acidity can be detected in the product.

For comparison, a liquid coffee concentrate is prepared in the same manner as described above except that the heat treatment is omitted. The resulting liquid coffee concentrate has a pH of 5.2. Within 4 weeks, this product drops below pH 5 (see FIG. 4 (■)). When assessed by expert tasters the product is unpleasantly sour.

Comparative Example 7

A liquid coffee concentrate having approximate 30% w/w dry solids was obtained by extraction a mixture of 50% Arabica and 50% Robusta coffee beans and processed according to the steps described in US 2010/0316784.

The pH of the liquid coffee extract was adjusted to 5.7 by addition of edible alkali, i.e. potassium hydroxide.

The resulting coffee concentrate was processed at 145° C. with a holding time of 90 seconds followed by rapid cooling to ambient condition.

The pH of the final product was approximately 5.2.

Only 100 mmoles acid/kg dry matter content in the final product were released. The pH dropped below 5.0 within 8 weeks.

When assessed by experts the product had a sour off taste.

What is claimed:

1. A process for the production of a liquid coffee concentrate with a pH of 4.8 to 6, the process comprising:
    subjecting roasted, ground coffee to one or more extraction steps with water resulting in a coffee extract;
    separating the coffee extract, either by fractionation during the extraction step(s) or by aroma recovery after the extraction step(s) resulting in a high aromatic coffee extract and a low aromatic coffee extract;
    subjecting at least 50 v/v % of the low aromatic coffee extract to a heat treatment of at least 120° C. for at most 30 minutes;
    concentrating at least the heat treated low aromatic coffee extract to form a concentrated low aromatic coffee extract;
    combining at least the concentrated low aromatic coffee extract with the high aromatic coffee extract, thereby obtaining a liquid coffee concentrate, wherein the liquid coffee concentrate has a pH of 4.8 to 6.

2. The process of claim 1, further comprising raising the pH of the low aromatic coffee extract after separating the coffee extract.

3. The process of claim 2, comprising raising the pH of at least 50 v/v % of the low aromatic extract.

4. The process of claim 3, comprising raising the pH of at least 50 v/v % of the low aromatic extract before or after the heat treatment but before the concentrating.

5. The process of claim 1, wherein the heat treatment is conducted at a temperature of at least 135° C., for a time of at most 15 minutes.

6. The process of claim 1, wherein the heat treatment is conducted from 120° C. to 200° C. for a time of 30 minutes to 10 seconds.

7. The process of claim 1, wherein the heat treatment is conducted from 135° C. to 180° C. for a time of 15 minutes to 1 minute.

8. The process of claim 1, wherein the heat treatment is conducted at about 150° C. for a time of about 5 minutes.

9. The process of claim 2, wherein the pH is raised to a value of 5 to 10.

10. The process of claim 4, wherein the pH is raised prior to the heat treatment.

11. The process of claim 10, wherein the pH is raised to a value of 6 to 8.

12. The process of claim 4, wherein the pH is raised after the heat treatment.

13. The process of claim 12, wherein the pH is raised to a value of 5 to 7.

14. The process of claim 2, wherein the pH is raised with an anion exchanger.

15. The process of claim 1, wherein the process results in a hydrolysation of at least 150 mmoles acid/kg dry matter solids content in the liquid coffee extract.

16. A process for the production of a liquid coffee concentrate with a pH of 4.8 to 6, the process comprising:
    subjecting roasted, ground coffee to one or more extraction steps with water resulting in a coffee extract;
    separating the coffee extract by fractionation during the extraction step(s) resulting in a high aromatic coffee extract and a low aromatic coffee extract, wherein the low aromatic coffee extract comprises a second primary extract and a secondary extract;
    subjecting at least part of the second primary extract to a heat treatment of at least 120° C. for at most 30 minutes, wherein the part of the second primary extract to be treated comprises at least 25 v/v % of the low aromatic coffee extract, resulting in a treated low aromatic coffee extract;
    concentrating at least the treated low aromatic coffee extract, resulting in a concentrated low aromatic coffee extract; and
    combining at least the concentrated low aromatic coffee extract with the high aromatic coffee extract, thereby obtaining a liquid coffee concentrate, wherein the liquid coffee concentrate has a pH of 4.8 to 6.

17. The process of claim 16, further comprising raising the pH of the low aromatic coffee extract after separating the coffee extract.

18. The process of claim 17, wherein the pH of at least part of the second primary extract is raised.

19. The process of claim 18, wherein the pH of at least part of the second primary extract is raised before or after the heat treatment but before the concentrating.

20. The process of claim 16, wherein the heat treatment is conducted at a temperature of at least 135° C., for a time of at most 15 minutes.

21. The process of claim 16, wherein the heat treatment is conducted from 120° C. to 200° C. for a time of 30 minutes to 10 seconds.

22. The process of claim 16, wherein the heat treatment is conducted from 135° C. to 180° C. for a time of 15 minutes to 1 minute.

23. The process of claim 16, wherein the heat treatment is conducted at about 150° C. for a time of about 5 minutes.

24. The process of claim 17, wherein the pH is raised to a value of 5 to 10.

25. The process of claim 19, wherein the pH is raised prior to the heat treatment.

26. The process of claim 25, wherein the pH is raised to a value of 6 to 8.

27. The process of claim 19, wherein the pH is raised after the heat treatment.

28. The process of claim 27, wherein the pH is raised to a value of 5 to 7.

29. The process of claim 17, wherein the pH is raised with an anion exchanger.

30. The process of claim 16, wherein the process results in a hydrolysation of at least 150 mmoles acid/kg dry matter solids content in the liquid coffee extract.

31. The process of claim 1, wherein the heat treatment is conducted at a temperature of at least 150° C., for a time of at most 10 minutes.

32. The process of claim 2, wherein the pH is raised with an anion exchange column.

33. The process of claim 16, wherein the heat treatment is conducted at a temperature of at least 150° C., for a time of at most 10 minutes.

34. The process of claim 17, wherein the pH is raised with an anion exchange column.

* * * * *